June 26, 1934.     A. P. BALL     1,964,554
FASTENER FOR TRIMMING MATERIAL
Filed Nov. 15, 1933
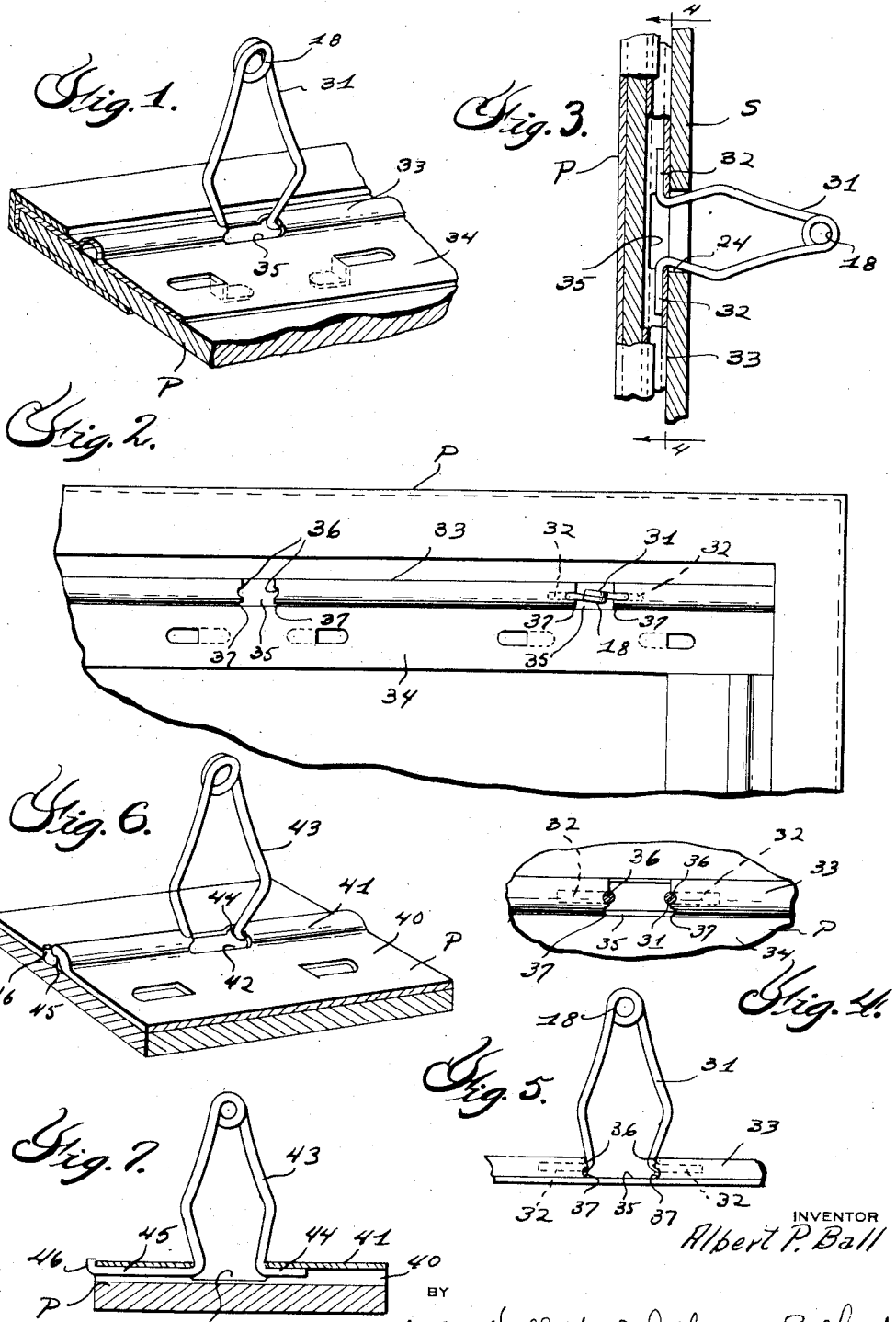
INVENTOR
Albert P. Ball
BY
Littemore Hulbert & Littemore Belknap
ATTORNEYS Patented June 26, 1934

1,964,554

UNITED STATES PATENT OFFICE 1,964,554

FASTENER FOR TRIMMING MATERIAL

Albert P. Ball, Detroit, Mich., assignor to Briggs Manufacturing Company, Detroit, Mich., a corporation of Michigan Application November 15, 1933, Serial No. 698,211

5 Claims. (Cl. 24—213)

This invention relates generally to fastener elements and more particularly to snap fastener devices especially designed for detachably securing trimming material panels to the frame work of vehicle bodies.

This application is a continuation in part of application Serial No. 498,811 filed November 28, 1930.

One of the primary objects of the present invention is to provide a fastener element of the type specified above which is extremely simple in construction and inexpensive to manufacture and one which may be readily assembled upon a strip of material.

Another object of this invention is to provide a fastener designed to secure materials in overlapping relation by a straight line insertion of the fastener into an opening formed in one of the materials.

Another object of this invention is to provide a fastener capable of efficient operation irrespective of variations in width of the material and the sizes of the opening into which the fastener is adapted to extend.

A further advantageous feature of this invention resides in the means employed for holding the fastener in operative position upon the material to be attached which means serves to hold the resilient portions of the fastener under tension.

Other objects of this invention will be made more apparent as this description proceeds, especially when considered in connection with the accompanying drawing, wherein Figure 1 is a fragmentary perspective view showing a backing for trimming material having my improved fastener assembled therewith;

Figure 2 is an elevational view of the structure shown in Figure 1;

Figure 3 is a sectional elevational view showing the trimming material panel or backing in assembled relation with its support;

Figure 4 is a sectional elevational view taken substantially on the plane indicated by line 4—4 of Figure 3;

Figure 5 is a fragmentary side elevational view of the structure;

Figure 6 is a perspective view of a slightly modified form of construction, and

Figure 7 is a sectional elevational view of the construction shown in Figure 6.

While the fastener illustrated herein is capable of many uses, it finds particular utility when used in fastening the upholstery or trimming material panels to the frame work of a motor vehicle or the like.

In the drawing, the reference character S indicates the support to which the upholstery or trimming panel P is adapted to be attached. The support S may, for instance, be the frame work of a motor vehicle provided with apertures 24 through which the fastener elements 31 project, and with which these fastener elements engage.

The fastener element 31 is preferably formed of a single strip of wire or the like bent intermediate its ends to form a loop 18 and terminating at its free ends in laterally extending projections 32. The looped intermediate portion 18 of the fastener forms the head, and the leg portions between the head and the lateral extensions are bowed outwardly to form diverging and converging portions. The width of the bowed portion of the fastener is substantially greater than the diameter of the openings 24 in the support so that when the fastener is in assembled relation with the support, as shown in Figure 3, the fastener as well as the panel P will be securely but detachably held in place.

The attaching portions 32 extend laterally in substantially the plane of the fastener and engage within a longitudinally extending rib 33 formed in the retainer strip 34 which is secured to the backing 1. As shown, the rib 33 is cut away to form a slot 35 through which the legs of the fastener 31 are adapted to project. The length of the slot 35 is slightly less than the distance between the inner ends of the diverging portions of the fastener element and the opposite walls of the slot are recessed as at 36 for receiving the inner end portions of the legs to position the fastener element in operative relation as shown in Figure 3, that is, substantially perpendicular to the plane of the panel P. If desired, the opposite ends of the slot 35 may be provided with recesses 37 adjacent the recesses 36 and so arranged as to maintain the fastener element in a substantially flat or inoperative position against the outer face of the backing. This latter arrangement is advantageous when the backing, having the fastener elements attached thereto, is transported from one point to another. Assuming that the fastener elements are in inoperative position and it is desired to assemble the backing upon the frame structure, the element is merely rotated from the inoperative position to the position shown in Figure 3. The construction is such that movement of the inner end portions of the fastener elements out of the recesses 37 causes the leg portions of the fastener element to compress slightly with the result that when the fastener element assumes its operative position, the leg portions will snap into engagement with the recesses 36.

The modification illustrated in Figure 6 is similar in construction to that in Figures 1 to 5, inclusive, in that the retainer plate 40 is provided with a rib 41 having a slot 42 of predetermined length intermediate the ends thereof for receiving the fastener element 43. The fastener element 43 is also similar in construction to the fastener elements hereinbefore set forth with the exception that the attaching portions 44 and 45 are of different lengths. As shown in Figures 6 and 7, the attaching portion 45 extends beyond one end of the rib 41 and is bent laterally as shown at 46 to prevent disengagement of the fastener element from the rib. The attaching portion 44, on the other hand, is considerably shorter than the attaching portion 45 and may be removed from the rib 41 by compressing the leg portions of the fastener element. In assembling the fastener element 43 with the retainer plate, it will be apparent that the attaching portion 45 is inserted within the rib through the slot 42 and then crimped as specified above. After this operation has been completed, the leg portions of the fastener element are compressed sufficiently to permit the shorter attaching portion 44 to engage within the rib 41 as shown in Figure 7. It is to be understood that the length of the slot 42 is slightly less than the distance between the inner ends of the leg portions of the fastener element with the result that the leg portions of the latter will be yieldably urged into engagement with opposite walls of the slot.

What I claim as my invention is:

1. A separable snap fastener for detachably securing a trim panel to a support comprising a fastener element having outwardly bowed leg portions insertable within an opening formed in said support and engageable with the side walls of the opening to maintain the element in assembled relation with the said support, said leg portions terminating in opposed straight extensions forming attaching portions, a retainer plate secured to said trim panel having a bearing portion in which said extensions are rotatably journalled whereby said fastener element may be moved from an inoperative position substantially parallel with said trim panel to an operative position perpendicular thereto, and means on said retainer plate engaging a leg portion of said fastener element for holding said element in operative position.

2. A separable snap fastener for detachably securing an upholstery panel to a support comprising a fastener element having outwardly bowed leg portions insertable within an opening formed in said support and engageable with the side walls of the opening to maintain the element in assembled relation with the said support, said leg portions terminating in oppositely extending attaching portions, a retainer plate secured to said upholstery panel having a rib-like bearing portion in which said attaching portions are journalled and a slot through which said leg portions extend whereby said fastener element may be moved to an inoperative position substantially parallel with said upholstery panel or to an operative position normal to said upholstery panel, and a recess in the edge of said slot engaging a leg portion of said fastener element for holding said element in operative position.

3. A separable snap fastener for detachably securing a trim panel and the like to a support comprising a fastener element having outwardly bowed resilient leg portions insertable within an opening formed in said support and engageable with the side walls of the opening to maintain the element in assembled relation with the said support, said leg portions terminating in oppositely extending attaching portions, means for removably securing said fastener element to said trim panel comprising a retainer plate secured to the trim panel and having a portion spaced laterally from the adjacent face of the last-mentioned member forming journals for slidably and rotatably mounting the attaching portions aforesaid, said laterally spaced portion having a slot therein through which the leg portions of the fastener element project whereby said fastener element may be moved to operative or inoperative positions substantially as described.

4. A separable snap fastener for detachably securing a trim panel or the like to a support comprising a fastener element having outwardly bowed leg portions insertable within an opening formed in said support and engageable with the side walls of the opening to maintain the element in assembled relation with the said support, said leg portions terminating in oppositely extending attaching portions, a retainer plate secured to said trim panel, said retainer plate having a portion shaped to form journals in which said attaching portions are rotatably mounted, said retainer plate also having a slot through which said leg portions extend whereby said fastener element may be moved to an inoperative position substantially parallel with said trim panel or to an operative position perpendicular to said trim panel, and means on said retainer plate for releasably holding said fastener element in operative position.

5. A fastener of the class described for detachably securing a trim panel to a support comprising a fastener element having outwardly bowed leg portions insertable within an opening formed in said support, said leg portions terminating in opposed straight extensions forming attaching portions, a retainer plate secured to said trim panel having a substantially rib-like portion formed with a slot, said legs extending through said slot and said attaching portions being rotatably journalled in said rib-like portion on opposite sides of said slot whereby said fastener element may be moved to operative or inoperative position, and means formed on said retainer plate engaging one of said leg portions for holding said fastener element in operative or inoperative position.

ALBERT P. BALL.